United States Patent
Takase

(10) Patent No.: US 10,983,382 B2
(45) Date of Patent: Apr. 20, 2021

(54) LIQUID CRYSTAL DISPLAY DEVICE INCLUDING RADIATOR FINS

(71) Applicant: SHARP KABUSHIKI KAISHA, Sakai (JP)

(72) Inventor: Kenji Takase, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/375,484

(22) Filed: Apr. 4, 2019

(65) Prior Publication Data

US 2019/0324317 A1    Oct. 24, 2019

(30) Foreign Application Priority Data

Apr. 23, 2018    (JP) .............................. JP2018-082185

(51) Int. Cl.
*G02F 1/1333*    (2006.01)
*G02F 1/13357*    (2006.01)
*G02F 1/1335*    (2006.01)

(52) U.S. Cl.
CPC .. *G02F 1/133385* (2013.01); *G02F 1/133603* (2013.01); *G02F 1/133628* (2021.01)

(58) Field of Classification Search
CPC combination set(s) only.
See application file for complete search history.

(56) References Cited

U.S. PATENT DOCUMENTS

| 9,545,039 B2 | 1/2017 | Tokuyama | |
|---|---|---|---|
| 9,826,669 B2 | 11/2017 | Tokuyama | |
| 2006/0245214 A1* | 11/2006 | Kim | G02B 6/0085 362/632 |
| 2008/0253080 A1* | 10/2008 | He | H05K 7/20972 361/679.48 |
| 2012/0075804 A1* | 3/2012 | Chen | G06F 1/203 361/696 |
| 2012/0281161 A1* | 11/2012 | Hubbard | G02F 1/133382 349/58 |

FOREIGN PATENT DOCUMENTS

JP    2015-170415 A    9/2015

* cited by examiner

*Primary Examiner* — Lauren Nguyen
(74) *Attorney, Agent, or Firm* — ScienBiziP, P.C.

(57) ABSTRACT

A liquid crystal display device (1) is equipped with a radiator fin (3) and cooling fans (4) on a back surface of the backlight unit (2). The radiator fin (3) includes a plurality of fins (311) arranged vertically along the backlight unit (2). The cooling fans (4), provided in a lower part of the backlight unit (2), are configured to draw air into the liquid crystal display device (1) from a side opposite to the backlight unit (2) and to create an airflow toward the radiator fin (3).

10 Claims, 15 Drawing Sheets

B-B

B-B

B-B

LIQUID CRYSTAL DISPLAY DEVICE INCLUDING RADIATOR FINS

CROSS-REFERENCE TO RELATED APPLICATIONS

The present application claims priority under 35 U.S.C. § 119(a) to Japanese Patent Application No. 2018-2185, filed Apr. 23, 2018. The contents of this application are incorporated herein by reference in its entirety.

BACKGROUND OF THE INVENTION

Field of the Invention

The present invention relates to a liquid crystal display device. In particular, the present invention relates to a liquid crystal display device equipped with a liquid crystal panel and a backlight unit configured to illuminate the liquid crystal panel.

Description of the Related Art

Liquid crystal display devices such as flat-panel LCD televisions have been developed to have large-screen displays. In addition, growing needs for super high-definition televisions and the like have pushed LED-backlit display devices into the mainstream. Liquid crystal display devices are not only applicable to flat-panel LCD televisions but also diversely applicable to PC monitors, digital signages, etc. For HDR (High Dynamic Range) control, a higher luminance and a higher output are also desired in the backlight units.

In the liquid crystal display devices of this type, a high-luminance, high-output backlight unit generates a greater amount of heat, and hence a sufficient heat-radiating measure is required for LEDs. For example, JP 2015-170415 A (PTL 1) discloses a liquid crystal display device equipped with a light source-mounted board for illuminating a display panel, and a plurality of radiator fins projecting from the back surface of the light source-mounted board, in order to dissipate heat that is generated by LEDs arranged on the light source-mounted board.

In the liquid crystal display device according to PTL 1, the radiator fins can dissipate the heat generated by the LEDs. However, when the LEDs are driven at a higher current to increase the luminance, a sufficient heat radiation effect cannot be expected by the radiator fins alone. As a result, the temperature of the device may rise so much as to make its display action unstable.

Heat may also affect the operation of a control board that is usually provided in the liquid crystal display device in order to control the liquid crystal panel and the backlight unit. Further, heat may cause deflection or expansion of a diffuser plate constituting the liquid crystal display device and various optical members including an optical sheet. The conventional liquid crystal displays need to tackle deterioration of durability, uneven luminance, and other problems caused by heat.

SUMMARY OF THE INVENTION

An object of the present invention is to provide a liquid crystal display device that can efficiently dissipate heat generated by a backlight unit and the like, that can prevent an increase in temperature by the heat dissipation, and that can employ a high-luminance, high-output backlight unit while ensuring a longer lifetime of the backlight unit.

A solution for achieving the above object of the present invention is based on a liquid crystal display device having a liquid crystal panel and a backlight unit equipped with a plurality of light sources for illuminating the liquid crystal panel from behind. According to an aspect of the present invention, this liquid crystal display device is provided with a radiator fin and a cooling fan on a back surface of the backlight unit not facing the liquid crystal panel. The cooling fan is configured to draw air into the liquid crystal display device from a side opposite to the backlight unit and to create an airflow toward the radiator fin.

Owing to this specified matter, heat generated by the light sources and the like can be effectively dissipated by the radiator fin provided on the back surface of the backlight unit, and the heat dissipation performance of the radiator fin can be enhanced by the airflow created by the cooling fan.

In a preferable, more specific configuration of the liquid crystal display device, the cooling fan is provided in a lower part of the backlight unit that is installed upright.

This configuration allows the airflow created by the cooling fan to flow from the lower part of the backlight unit and upwardly along the radiator fin, and can thereby cool the radiator fin entirely.

In a preferable configuration of the liquid crystal display device, the radiator fin has a plurality of fins arranged vertically along the backlight unit that is installed upright.

This configuration not only enables the radiator fin to dissipate generated heat but also enhances the heat dissipation efficiency by generating thermal convection in vertical directions.

In a preferable configuration of the liquid crystal display device, the radiator fin is provided entirely across the back surface of the backlight unit, and includes a dense area in which the fins are arranged more densely than in a remaining area on the back surface of the backlight unit.

Although the radiator fin in the foregoing configurations can effectively dissipate heat in the liquid crystal display device, the radiator fin in this configuration is further arranged to include the dense area in which the fins are arranged more densely. In response to the requests for larger liquid crystal display devices, larger screens, etc., the presence of the dense area can enhance the heat dissipation effect even further.

In a preferable configuration of the liquid crystal display device, the cooling fan is provided in the remaining area excluding the dense area, in a lower part of the backlight unit that is installed upright.

Owing to this configuration, the heat dissipation effect in the dense area is enhanced by the densely arranged fins, and the heat dissipation effect in the remaining area excluding the dense area is enhanced by a synergistic effect of the radiator fin and the airflow created by the cooling fan.

In a preferable configuration of the liquid crystal display device, the cooling fan is a centrifugal fan configured to draw in air in a rotational axis direction of the cooling fan and to create an airflow in a diametrical direction of the cooling fan.

By allowing the airflow created by the cooling fan to flow toward the radiator fin, the heat dissipation effect by the radiator fin can be enhanced even further.

The liquid crystal display device may further have a liquid crystal panel control board configured to control driving of the liquid crystal panel, wherein the liquid crystal panel control board faces a back side of the radiator fin not facing the backlight unit, and the liquid crystal panel control board is spaced from the radiator fin.

When heat is generated by the backlight unit on one side and by the liquid crystal panel control board on the other side, the heat can be dissipated via the radiator fin interposed between the backlight unit and the liquid crystal panel control board. This configuration can prevent an increase in temperature of the backlight unit and the liquid crystal panel control board.

In a preferable configuration of the liquid crystal display device, the liquid crystal panel control board is equipped with a heat-radiating member on a front surface thereof facing the radiator fin.

This configuration can lower the temperature on the front surface of the liquid crystal panel control board facing the radiator fin, and can thereby prevent an increase in temperature even further.

In a preferable configuration of the liquid crystal display device, the radiator fin includes a first radiator fin provided on the back surface of the backlight unit, and a second radiator fin opposed to the first radiator fin and provided on the front surface of the liquid crystal panel control board.

When heat is generated by the backlight unit and by the liquid crystal panel control board, the generated heat can be distributed between the first radiator fin and the second radiator fin and can be dissipated therefrom. This configuration can enhance the heat dissipation effect even further.

Preferably, the liquid crystal display device has a cabinet for covering the backlight unit and the liquid crystal panel control board, placed behind the backlight unit; a control IC chip mounted on a back surface of the liquid crystal panel control board not facing the radiator fin; and a radiator block provided between the control IC chip and the cabinet.

When heat is generated by the control IC chip mounted on the liquid crystal panel control board, the heat can be dissipated via the radiator block. This configuration can prevent an increase in temperature.

In a preferable configuration of the liquid crystal display device, the cabinet is equipped with a heat-radiating member on a front surface and a back surface thereof.

When heat is generated by the backlight unit, the liquid crystal panel control board, etc., the heat can be effectively dissipated via the heat-radiating member on the cabinet. This configuration can prevent an increase in temperature even further.

In a preferable configuration of the liquid crystal display device, the radiator fin is equipped with a heat-radiating member.

This configuration is expected to give a synergistic effect of the heat dissipation effect by the radiator fin and the heat dissipation effect by the heat-radiating member.

In the liquid crystal display device according to the present invention, the radiator fin can efficiently dissipate heat, and the cooling fan can enhance the heat dissipation effect of the radiator fin. The liquid crystal display device can prevent an increase in temperature even when using a high-luminance, high-output backlight unit.

DETAILED DESCRIPTION OF THE INVENTION

Hereinafter, liquid crystal display devices according to some embodiments of the present invention are described with reference to the drawings.

Figure 1:
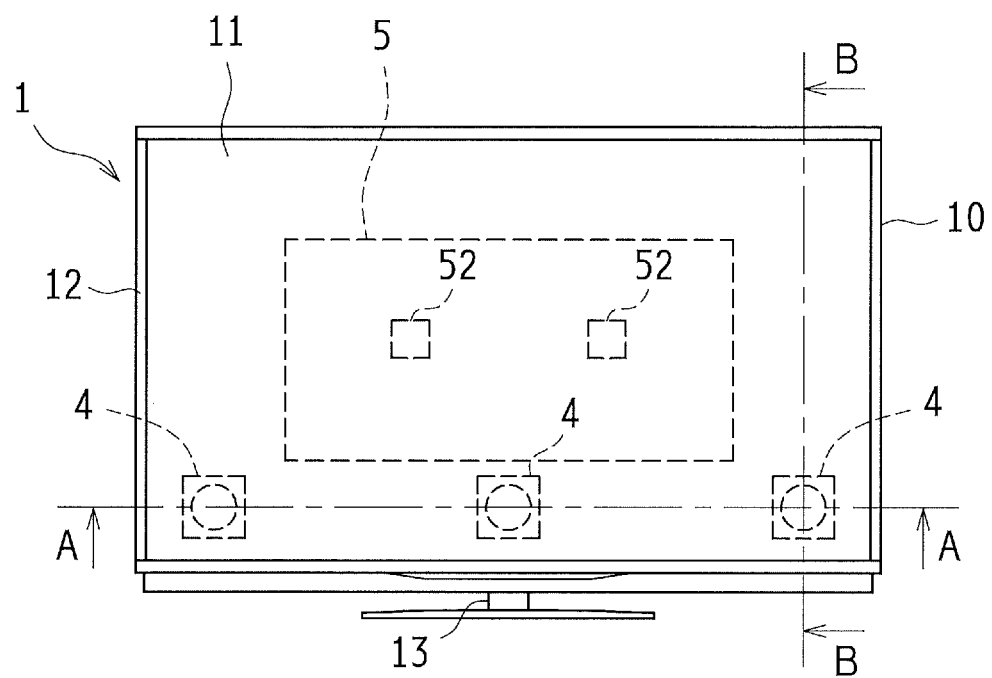
FIG. 1 is a front external view of a liquid crystal display device corresponding to each embodiment of the present invention.

As an example of the liquid crystal display devices 1 according to the present invention, FIG. 1 gives a front external view of an LCD television equipped with a liquid crystal panel 11. The liquid crystal display device 1 is equipped with external parts such as a liquid crystal panel 11 for displaying a video image or the like, a bezel 12 for holding an outer periphery of the liquid crystal panel 11, and a stand 13 for supporting a device body 10 that includes the liquid crystal panel 11 and the bezel 12.

The liquid crystal display devices 1 according to Embodiments 1-6 to be described below are characterized by their internal structures, rather than their external structures. The external parts shown in FIG. 1 are common to all Embodiments.

Embodiment 1

Figure 2:
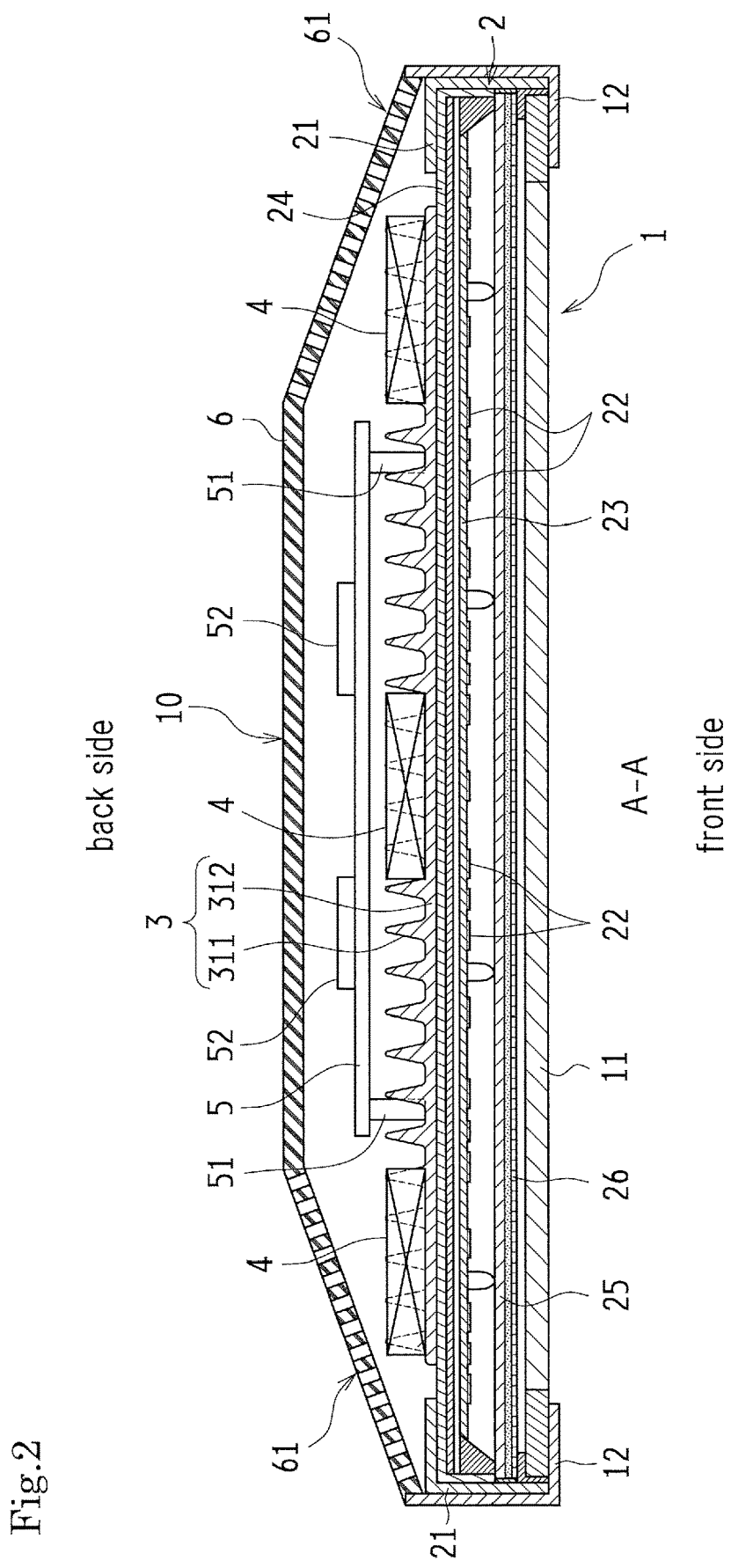
FIG. 2 is a sectional view of a liquid crystal display device according to Embodiment 1 of the present invention, taken along the line A-A in FIG. 1.
Figure 3:
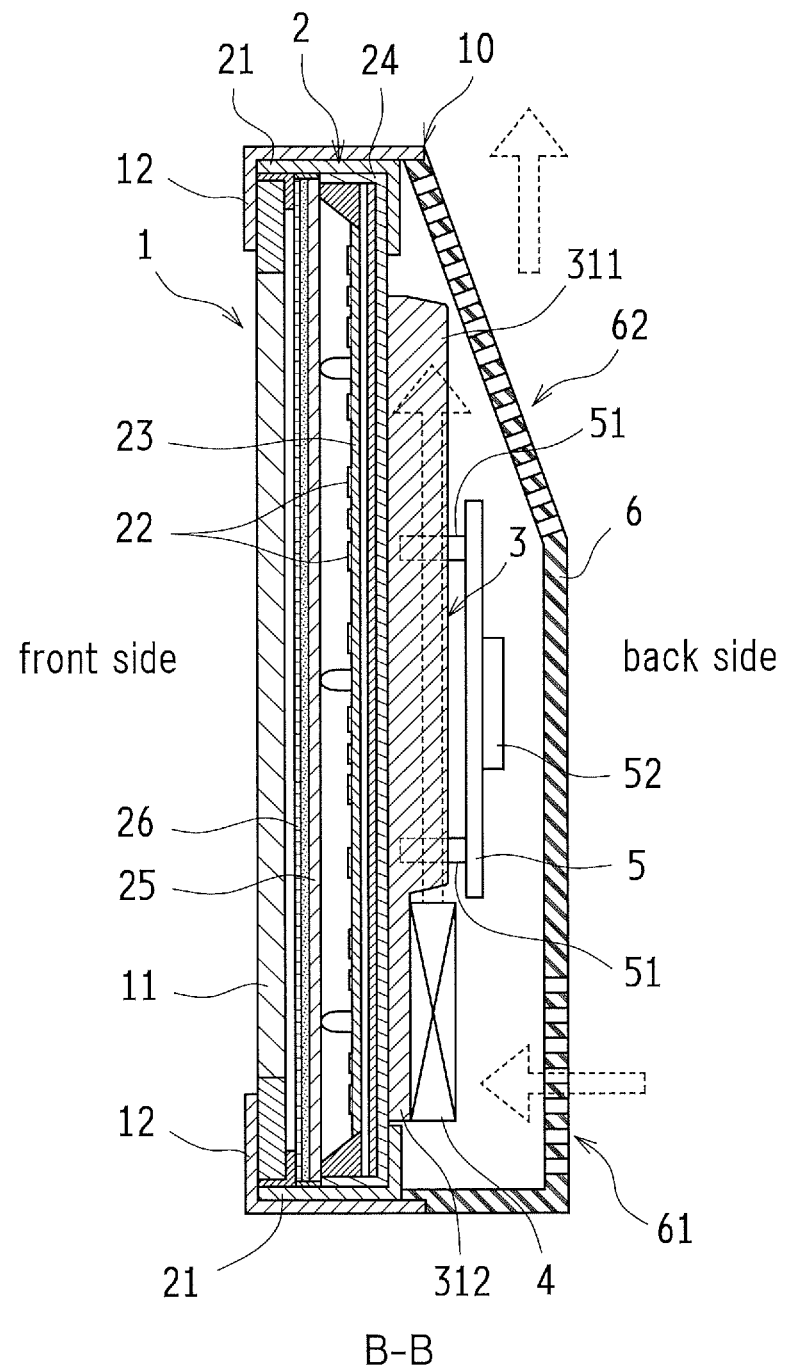
FIG. 3 is a sectional view of the liquid crystal display device according to Embodiment 1 of the present invention, taken along the line B-B in FIG. 1.

FIGS. 2 and 3 show a device body 10 in a liquid crystal display device 1 according to Embodiment 1 of the present invention. FIG. 2 is a sectional view taken along the line A-A in FIG. 1. FIG. 3 is a sectional view taken along the line B-B in FIG. 1.

The liquid crystal display device 1 is composed of external parts including a liquid crystal panel 11 as shown in FIG. 1, a backlight unit 2, optical components for diffusing and controlling light emitted from the backlight unit 2, a radiator fin 3, cooling fans 4, a liquid crystal panel control board 5 that includes various control boards for driving and controlling the liquid crystal panel 11 and an LED board 23 of the backlight unit 2.

The external parts include, for example, the liquid crystal panel 11 for displaying a video image in the device body 10, a bezel 12 and a cabinet 6 for holding the liquid crystal panel 11, and a stand 13 for supporting the device body 10.

As shown in FIG. 1, the liquid crystal panel 11 is held by the stand 13 and the bezel 12, with its front surface (a display surface) being oriented vertically. In the device body 110 of the liquid crystal display device 1 shown in FIG. 2, the cabinet 6 is placed behind the liquid crystal panel 11 so as to cover and protect the backlight unit 2 and the liquid crystal panel control board 5.

The cabinet 6 has an inlet port 61 in its lower part and an outlet port 62 in its upper part, as shown in FIG. 3. The inlet port 61 and the outlet port 62 are made up of multiple slits or holes penetrating through the front and back surfaces of the cabinet 6.

The backlight unit 2 is composed of a panel chassis 21, optical components, a plurality of LEDs (light-emitting diodes) 22 as light sources for illuminating the liquid crystal panel 11 from behind, an LED board (light-emitting diode board) 23 on which the LEDs 22 are mounted, and a backlight chassis 24 behind the LED board 23.

The optical components, such as a diffuser plate 25, a plurality of optical sheets 26, are disposed between the liquid crystal panel 11 and the LEDs 22. Light emitted from the LEDs 22 is diffused by the diffuser plate 25 and controlled by the optical sheets 26. The optical components, the LED board 23, and the backlight chassis 24 are held by the panel chassis 21.

As shown in FIG. 3, the liquid crystal panel 11 is installed vertically upright. The backlight unit 2 is also installed vertically upright, parallel to the liquid crystal panel 11. The radiator fin 3 and the cooling fans 4 are disposed on the back surface of the backlight unit 2 (a surface of the backlight unit 2 not facing the liquid crystal panel 11, specifically a back surface of the backlight chassis 24).

The radiator fin 3 has multiple fins 311 that are arranged vertically along the upright backlight unit 2, and a flat plate-like main body 312 that holds the fins 311 integrally. The radiator fin 3 is disposed such that the main body 312 abuts on the back surface of the backlight unit 2 (the back surface of the backlight chassis 24).

The fins 311 are thin parts projecting from the backlight unit 2 side to the liquid crystal panel control board 5 side, with their extreme ends pointing to the liquid crystal panel control board 5. The radiator fin 3 is positioned in proximity to the LED board 23.

As shown in FIG. 3, the cooling fans 4 are installed in a lower part of the upright backlight unit 2. In the embodiment represented by the front view of FIG. 1, three cooling fans 4 are arranged equidistantly near the left and right edges, and at the center. As shown in FIG. 2, the radiator fin 3 does not have the fins 311 at the installation positions of the cooling fans 4. The cooling fans 4 are sized within the thickness of the radiator fin 3 (the length of the fins 311 in the depth direction).

Thus, the cooling fans 4 are provided behind the backlight unit 2, without affecting the overall thickness of the liquid crystal display device I The multiple fins 311 of the radiator fin 3 are disposed above and between the cooling fans 4.

The cooling fans 4 draw air into the liquid crystal display device 1 from behind (on the side opposite to the backlight unit 2) and create an airflow toward the radiator fin 3. For example, the cooling fans 4 are built-in centrifugal fans that draw in air in a rotational axis direction of the fans and that create an airflow in a diametrical direction of the fans.

The liquid crystal panel control board 5 controls driving of the liquid crystal panel 11. As shown in FIG. 2, the liquid crystal panel control board 5 faces the back side of the radiator fin 3 (a side of the radiator fin 3 not facing the backlight unit 2. The liquid crystal panel control board 5, having a rectangular outline that is smaller than the backlight unit 2, is disposed centrally behind the backlight unit 2.

Spacers 51 are interposed between the liquid crystal panel control board 5 and the radiator fin 3, so as to secure a clearance therebetween. Control IC chips 52 are mounted on the back surface of the liquid crystal panel control board 5 (a surface of the liquid crystal panel control board 5 not facing the radiator fin 3).

In this liquid crystal display device 1, heat generated by the LEDs 22 is transferred via the LED board 23 to the radiator fin 3, which is made of a highly heat-conductive metal such as aluminum or a stainless steel. The multiple fins 311 increase the surface area of the radiator fin 3, secure a larger contact area with external air, and thereby improve the heat exchange efficiency. Heat transfer to the radiator fin 3 prevents an increase in temperature of the LEDs 22 and the LED board 23, and efficiently dissipates the generated heat.

The cooling fans 4 introduce external air from the inlet port 61 of the cabinet 6, and create an airflow from the back to the front in the liquid crystal display device 1.

The cooling fans 4 allow the introduced air to flow upwardly along the back surface of the backlight unit 2, and thereby cause dissipation of heat from the outlet port 62 to the outside. During this process, the introduced air flows through the fins 311 of the radiator fin 3 and through the clearance between the liquid crystal panel control board 5 and the radiator fin 3, and the upward airflow cools the radiator fin 3 and the liquid crystal panel control board 5.

In the liquid crystal display device 1 according to Embodiment 1, the backlight unit 2 can transfer the heat generated by the LEDs 22 to the radiator fin 3 provided behind the LED board 23. Thus, the heat generated by the LEDs 22 is dissipated to the outside of the backlight unit 2.

The backlight unit 2 can cool the LEDs 22 and can prevent an increase in temperature more efficiently than conventional arrangements. As a result, the LEDs 22 can be driven at a higher current to increase the luminance. The liquid crystal display device 1 can suppress a thermal influence to the optical components, and can thereby prevent uneven luminance at the backlight unit 2. Eventually, this embodiment ensures a stable display action by the liquid crystal panel 11, and can achieve the high-output, high-luminance liquid crystal display device 1.

Embodiment 2

Figure 4:
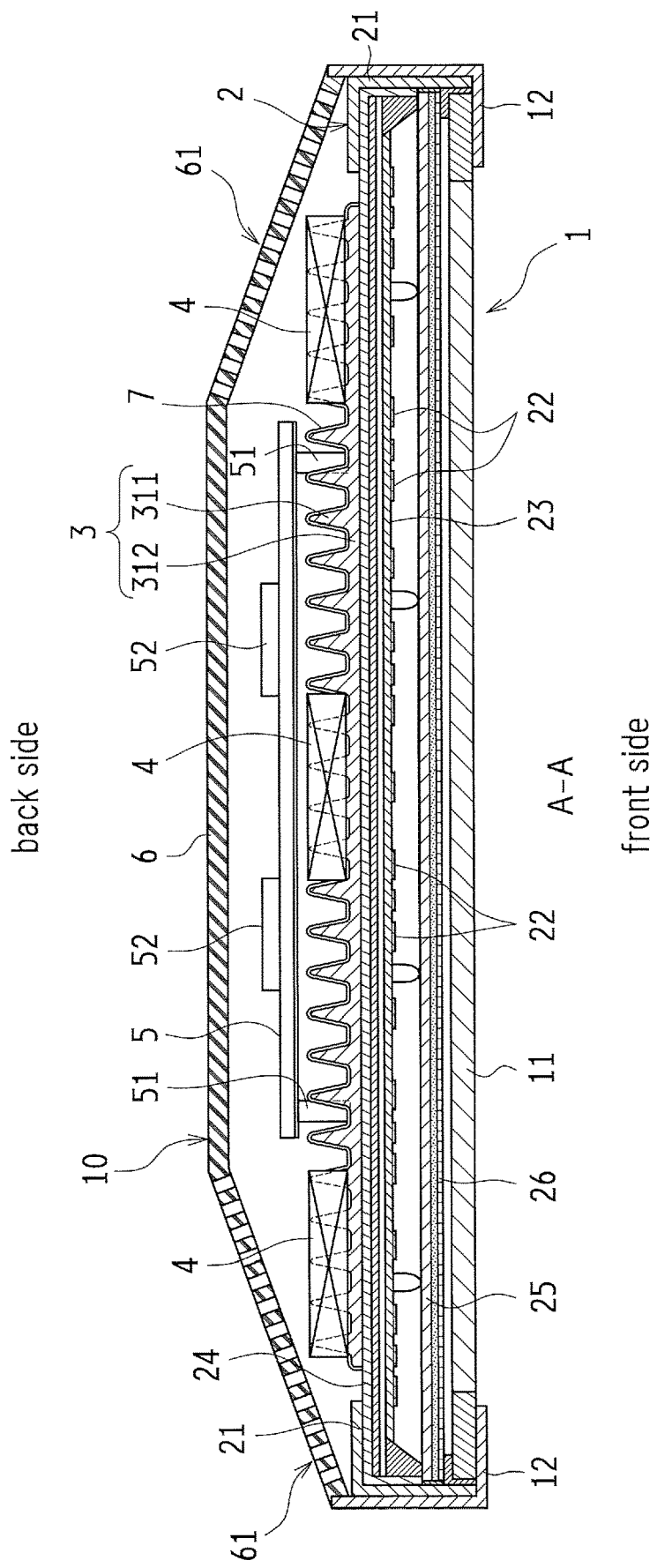
FIG. 4 is a sectional view of a liquid crystal display device according to Embodiment 2 of the present invention, taken along the line A-A in FIG. 1.
Figure 5:
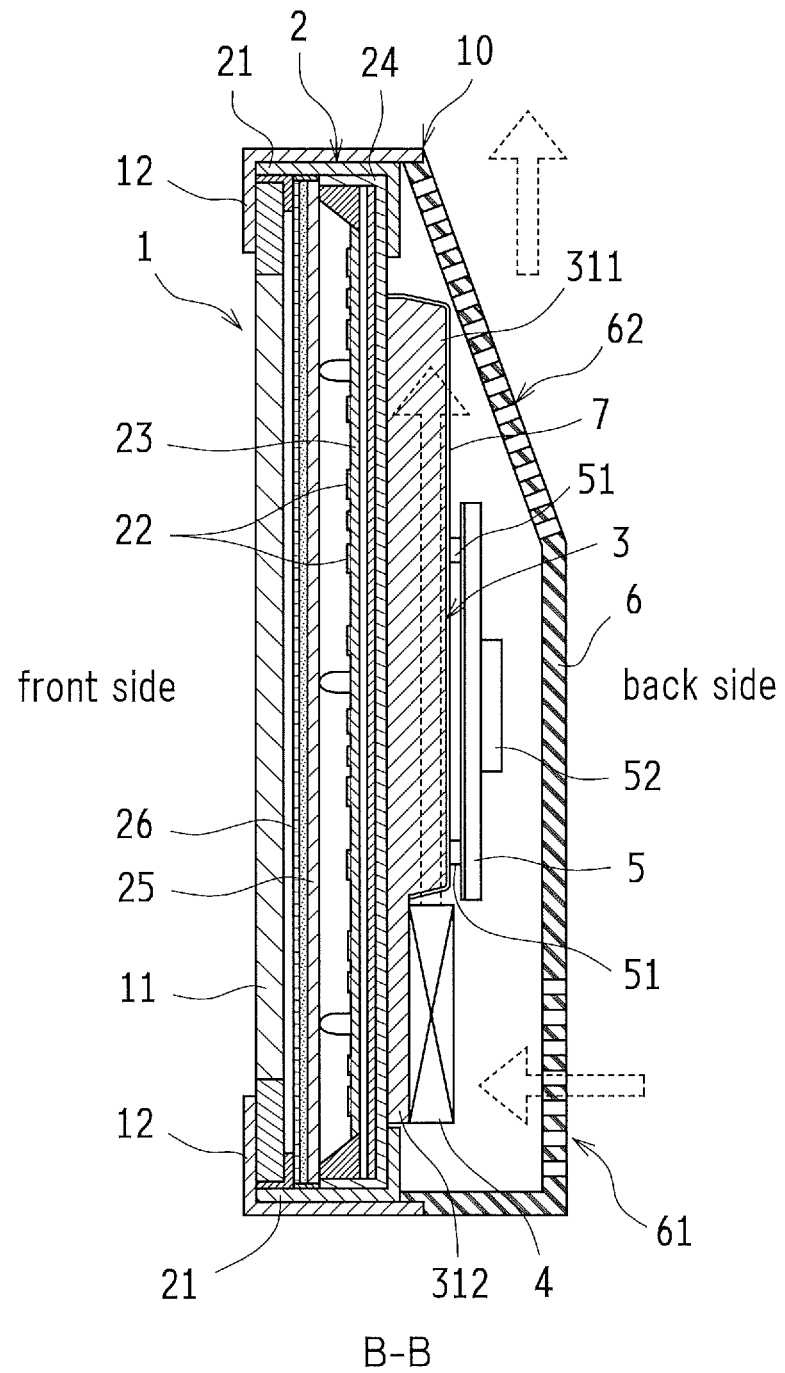
FIG. 5 is a sectional view of the liquid crystal display device according to Embodiment 2 of the present invention, taken along the line B-B in FIG. 1.

FIGS. 4 and 5 show a device body 10 in a liquid crystal display device 1 according to Embodiment 2 of the present invention. FIG. 4 is a sectional view taken along the line A-A in FIG. 1. FIG. 5 is a sectional view taken along the line B-B in FIG. 1. The liquid crystal display devices 1 according to Embodiments 2 to 6 below have the same basic configuration as the liquid crystal display device 1 in Embodiment 1. Accordingly, the identical configurations are described by the same reference numerals as those used in Embodiment 1 to omit their detailed descriptions.

A feature of the liquid crystal display device 1 according to Embodiment 2 resides in heat-radiating members 7 on the radiator fin 3 and the liquid crystal panel control board 5. For the radiator fin 3 disposed behind the backlight unit 2, the heat-radiating member 7 is provided at least on its surface not in contact with the backlight unit 2.

Specifically, the heat-radiating member 7 entirely covers the outer surface of the radiator fin 3 that is disposed in tight contact with the backlight chassis 24. Thus, the main body 312 and the fins 311 of the radiator fin 3, disposed between the backlight unit 2 and the cabinet 6, have their outer surfaces covered with the heat-radiating member 7. For the liquid crystal panel control board 5, the heat-radiating member 7 is provided on its surface facing the radiator fin 3 (the front surface).

The base material for the heat radiating members 7 is a heat-radiating material having a high heat conductivity and a high heat dissipation capacity. The heat-radiating members 7 improve heat dissipation efficiency of the radiator fin 3 and the liquid crystal panel control board 5.

The heat-radiating members 7 may be coating films applied to the radiator fin 3 and the liquid crystal panel control board 5, or may be sheet materials attached to the radiator fin 3 and the liquid crystal panel control board 5. The heat-radiating members 7 may contain at least one of infrared-emitting materials having a high infrared emissivity including oxides of transition elements such as alumite (anodic oxide film), manganese dioxide ($MnO_2$), chromium oxide ($Cr_2O_3$), iron oxide ($Fe_2O_3$), cobalt oxide (CoO), and copper oxide (CuO); carbon black; etc. The heat-radiating members 7 may also be made of a heat-conductive, heat-radiating coating material (a coating material whose emission is close to blackbody radiation), a highly heat-radiating sheet material (e.g., a graphite sheet), or the like.

These materials impart a heat-radiating function to the heat-radiating members 7. The heat-radiating members 7 radiate thermal energy in the backlight unit 2 as electromagnetic waves, converting higher temperatures into shorter-wavelength electromagnetic waves. Heat radiation by the heat-radiating members 7 lowers the surface temperature of the radiator fin 3 and the liquid crystal panel control board 5 covered by the heat-radiating members 7, and enhances the cooling effect. Since the heat generated by the LEDs 22 in the backlight unit 2 is effectively dissipated to the outside, the backlight unit 2 can cool the LEDs 22 and can prevent an increase in temperature more efficiently than conventional arrangements.

Preferably, the heat-radiating member 7 on the radiator fin 3 and the heat-radiating member 7 on the liquid crystal panel control board 5 are made of an identical heat-radiating material. By using an identical heat-radiating material, the heat-radiating members 7 can have the same coefficient of linear expansion on the radiator fin 3 and on the liquid crystal panel control board 5, and can thereby distribute a deforming stress such as expansion and contraction.

Embodiment 3

Figure 6:
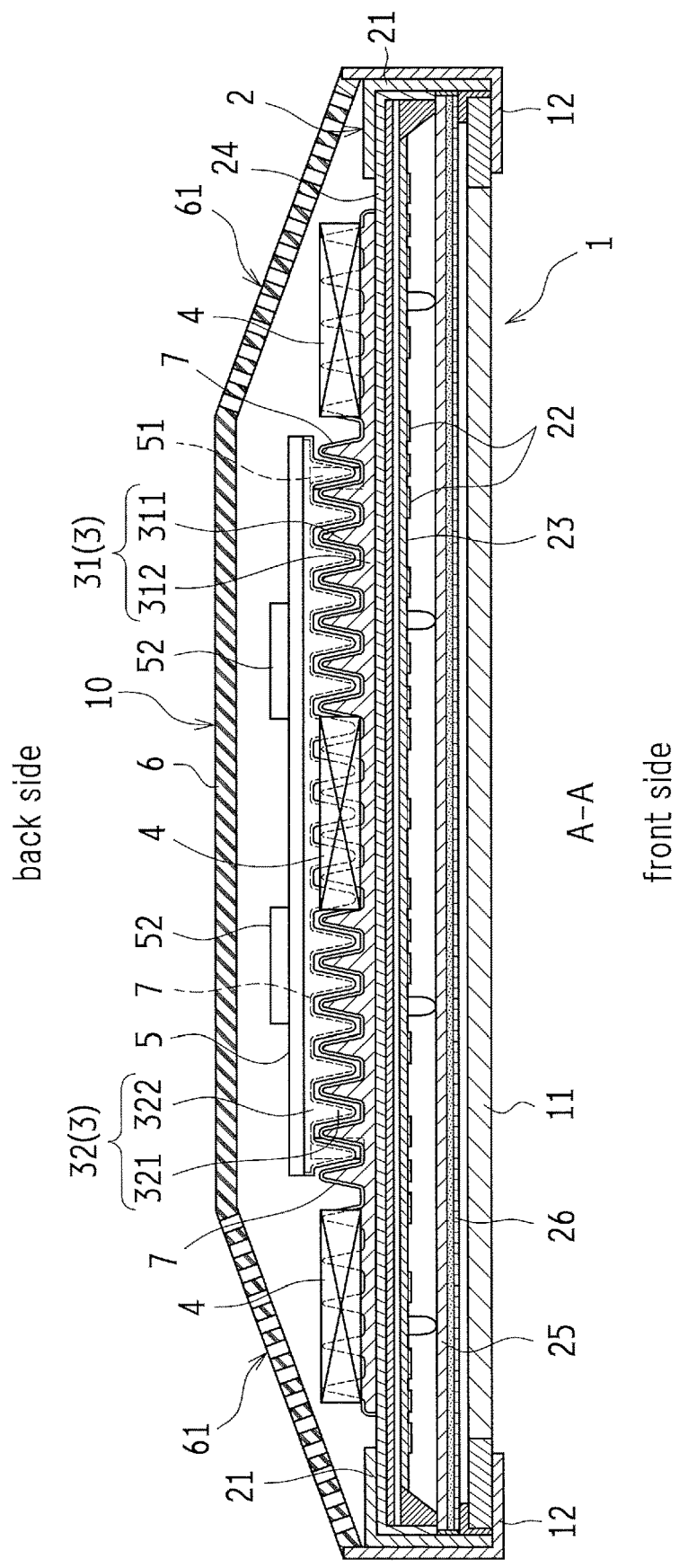
FIG. 6 is a sectional view of a liquid crystal display device according to Embodiment 3 of the present invention, taken along the line A-A in FIG. 1.
Figure 7:
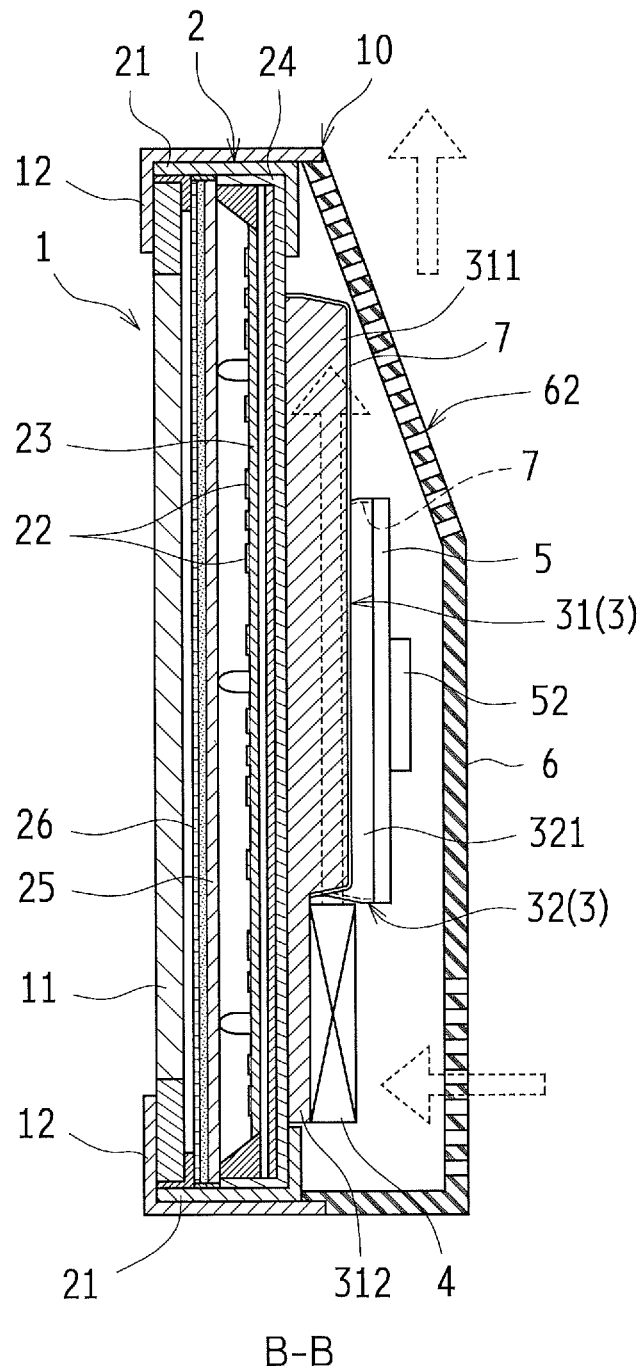
FIG. 7 is a sectional view of the liquid crystal display device according to Embodiment 3 of the present invention, taken along the line B-B in FIG. 1.

FIGS. 6 and 7 show a device body 10 in a liquid crystal display device 1 according to Embodiment 3 of the present invention. FIG. 6 is a sectional view taken along the line A-A in FIG. 1. FIG. 7 is a sectional view taken along the line B-B in FIG. 1. A feature of the liquid crystal display device 1 according to Embodiment 3 resides in a radiator fin 3 composed of a first radiator fin 31 and a second radiator fin 32.

The radiator fin 3 includes a first radiator fin 31 provided on the back surface of the backlight unit 2, and a second radiator fin 32 opposed to the first radiator fin 31 and provided on the front surface of the liquid crystal panel control board 5. The first radiator fin 31 is similar to the radiator fin 3 in the liquid crystal display device 1 according to Embodiment 2, and has a main body 312 and multiple fins 311 each covered by a heat-radiating member 7.

The second radiator fin 32 also has multiple fins 321 and a main body 322 that holds the fins 321 integrally. The surface of the second radiator fin 32 is covered by the heat-radiating member 7. The second radiator fin 32 is disposed such that the extreme ends of the fins 321 point to the first radiator fin 31. The fins 311 of the first radiator fin 31 and the fins 321 of the second radiator fin 32 are opposed to and engaged with each other, with the fins 311 and the fins 321 being spaced from each other to avoid mutual contact.

Also in the liquid crystal display device 1 according to Embodiment 3, heat generated by the LEDs 22 and other components in the backlight unit 2 is transferred via the LED board 23 to the first radiator fin 31 and dissipated by the first radiator fin 31. Likewise, heat generated by the liquid crystal panel control board 5 equipped with the control IC chips 52 as the heating element is transferred to and dissipated by the second radiator fin 32.

The cooling fans 4 introduce external air from the inlet port 61 of the cabinet 6, create an airflow by allowing the air to flow toward the first radiator fin 31 and the second radiator fin 32, and thereby cause dissipation of heat from the outlet port 62 to the outside without stagnation. The heat-radiating members improve the heat dissipation effect, and prevent an increase in temperature of the radiator fin 3 and the liquid crystal panel control board 5.

Figure 8:
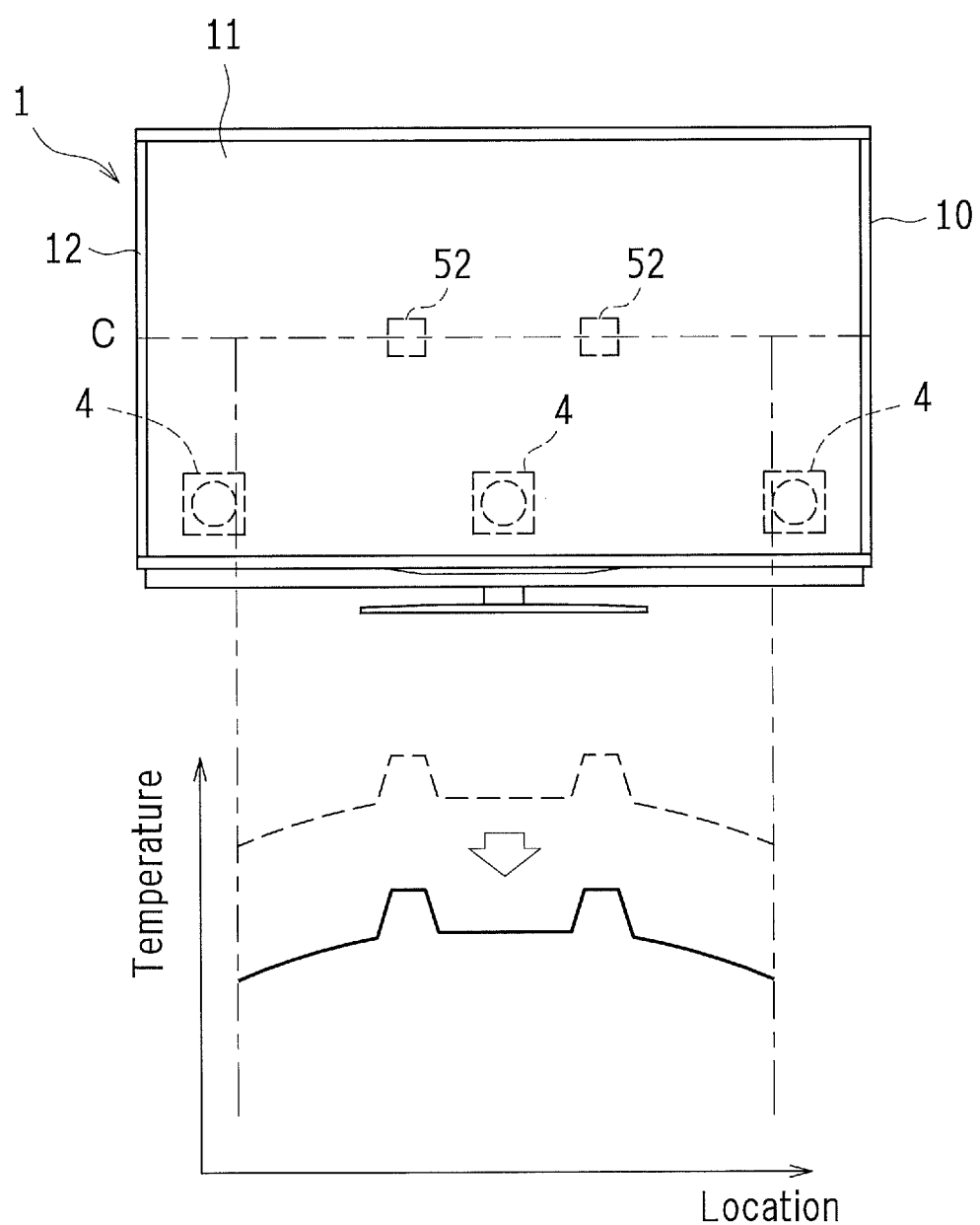
FIG. 8 is an explanatory illustration showing an example of temperature distribution in the liquid crystal display device according to Embodiment 3 of the present invention.

FIG. 8 is an explanatory illustration showing temperature distribution in the liquid crystal display device 1 according to Embodiment 3. The graph in FIG. 8 represents, by a solid line, temperature distribution in the liquid crystal display device 1 on the line C. For comparison, temperature distribution in a conventional example shown in FIG. 15 is given by a broken line.

As evident from FIG. 8, the temperature of the liquid crystal display device 1 according to Embodiment 3 increases at the control IC chips 52 mounted on the liquid crystal panel control board 5, but the overall temperature is lower than in the conventional example. This result proves sufficient heat dissipation and effective cooling in the liquid crystal display device 1. Thus, the liquid crystal display device 1 can solve the problem of an unstable display action due to heat generation by the backlight unit 2 and the control IC chips 52.

Figure 15:
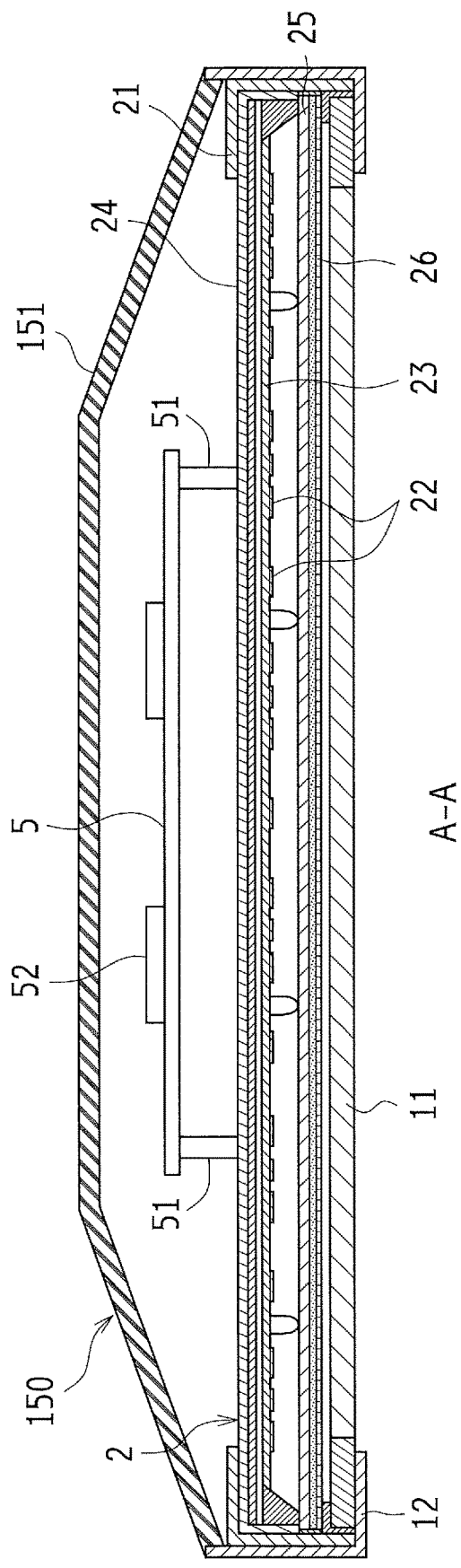
FIG. 15 is a sectional view, corresponding to FIG. 6, of a liquid crystal display device according to a conventional example.

A liquid crystal display device 150, shown for comparison in FIG. 15 as a conventional example, is similar to the liquid crystal display device 1 according to Embodiment 3 in some respects, such as the liquid crystal panel 11 and the backlight unit 2. However, the conventional liquid crystal display device 150 omits a radiator fin and cooling fans on the back surface of the backlight unit 2, and also omits an inlet port and an outlet port in a cabinet 151.

Embodiment 4

Figure 9:
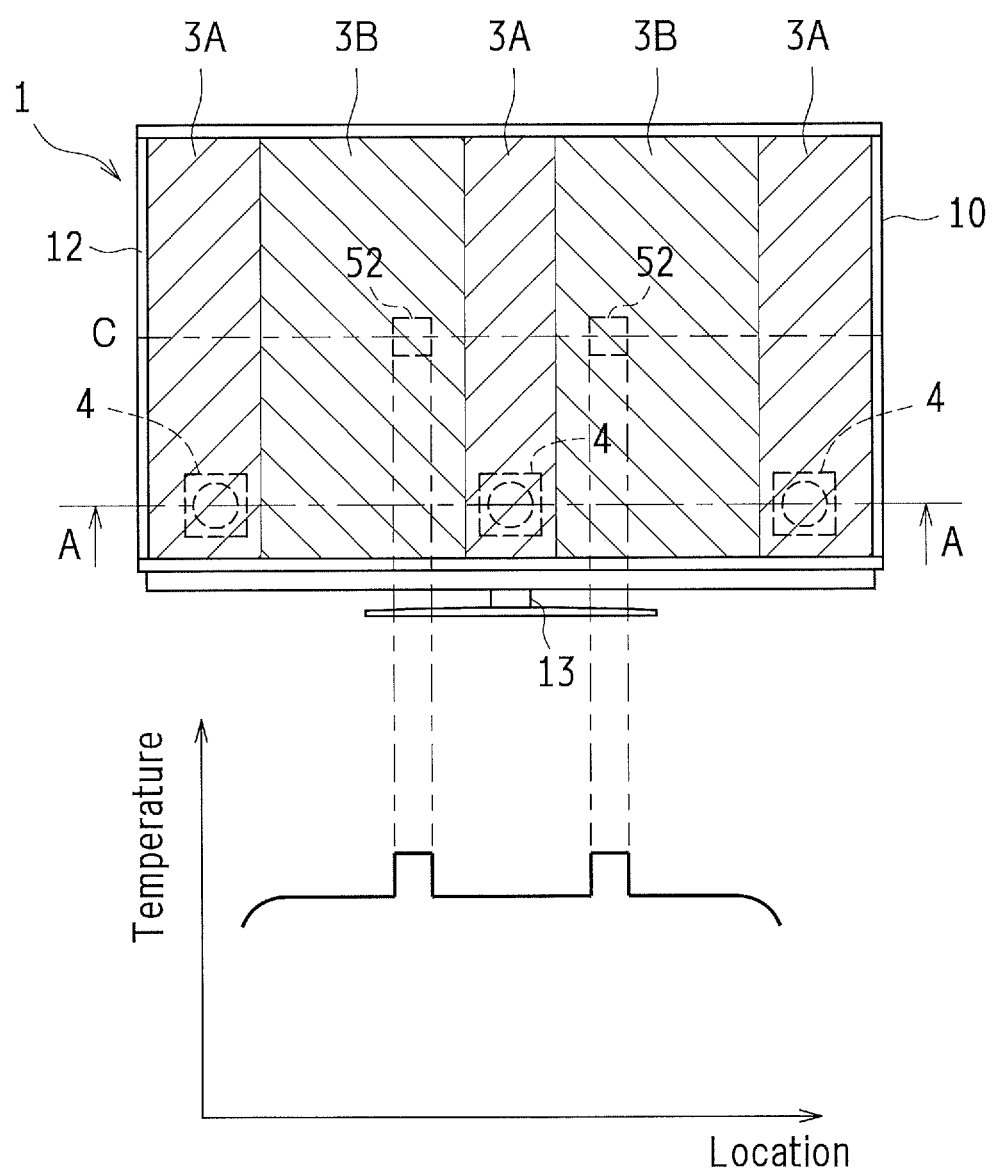
FIG. 9 is an explanatory illustration showing a liquid crystal display device according to Embodiment 4 of the present invention and an example of temperature distribution therein.
Figure 10:
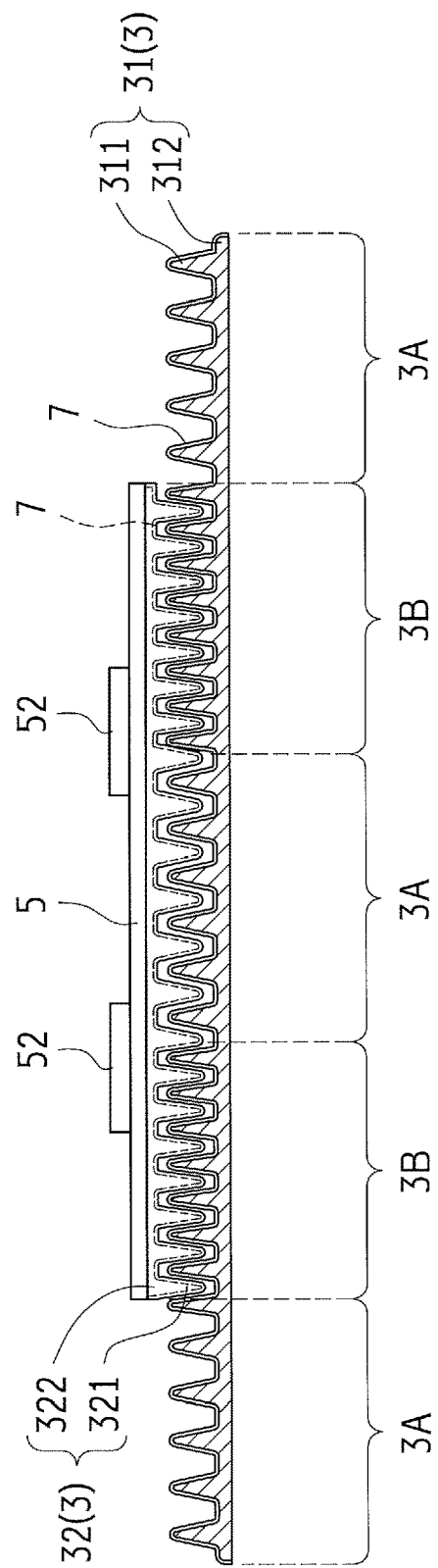
FIG. 10 is a sectional view of a radiator fin in the liquid crystal display device according to Embodiment 4 of the present invention, taken along the line A-A in FIG. 9.

FIG. 9 is an explanatory illustration showing a liquid crystal display device 1 according to Embodiment 4 and an example of temperature distribution therein. FIG. 10 is a sectional view of a radiator firm 3 in Embodiment 4, taken along the line A-A in FIG. 9. A feature of the liquid crystal display device 1 according to Embodiment 4 resides in the arrangement of fins of a radiator fin 3.

The radiator fin 3 is provided entirely across the back surface of the backlight unit 2. Similar to Embodiment 3, the radiator fin 3 includes the first radiator fin 31 and the second radiator fin 32. In this embodiment, the radiator fin 3 further includes dense areas 3B in which the fins 311, 321 are densely arranged in large numbers, and sparse areas 3A in which the fins 311, 321 are sparsely arranged in smaller numbers than in the dense areas 3B.

For example, as shown in FIG. 9, the sparse areas 3A and the dense areas 3B in the radiator fin 3 alternate on the back surface of the backlight unit 2. In the illustration, the sparse areas 3A are provided along the left edge and the right edge, and across the center of the device body 10, and the dense areas 3B are provided between the sparse areas 3A. The graph in FIG. 9 represents, by a solid line, temperature distribution in the liquid crystal display device 1 on the line C.

In the radiator fin 3 shown in FIG. 10, both of the fins 311 of the first radiator fin 31 and the fins 321 of the second radiator fin 32 in the dense areas 3B are provided in greater numbers and at higher densities than in the sparse areas 3A. In the dense areas 3B, both of the first radiator fin 31 and the second radiator fin 32 have thinner fins 311, 321 at smaller intervals between neighboring fins 311, 321 than in the sparse areas 3A.

The thus configured radiator fin 3 facilitates natural convection of air from the bottom to the top in the dense areas 3B having the densely arranged fins 311, 321, and thereby ensures a higher heat dissipation effect.

Further in this embodiment, the cooling fans 4 are provided one each in the sparse areas 3A of the radiator fin 3. The cooling fans 4 disposed in the lower part of the sparse areas 3A introduce external air and create an upward airflow.

Owing to the thus configured radiator fin 3, the heat dissipation effect in the dense areas 3B is enhanced by the densely arranged fins 311, 321, and the heat dissipation effect in the sparse areas 3A is enhanced by a synergistic action of the fins 311, 321 and the airflow created by the cooling fans 4.

This embodiment is expected to give a high heat dissipation effect in both the sparse areas 3A and the dense areas 3B, so that heat can be effectively dissipated entirely across the back surface of the backlight unit 2. This embodiment can also achieve a sufficient heat dissipation effect by installing the cooling fans 4 selectively in the sparse areas 3A, instead of installing the cooling fans 4 all over the back surface of the backlight unit 2. Use of fewer cooling fans 4 can reduce the power consumption and cut the cost.

Embodiment 5

Figure 11:
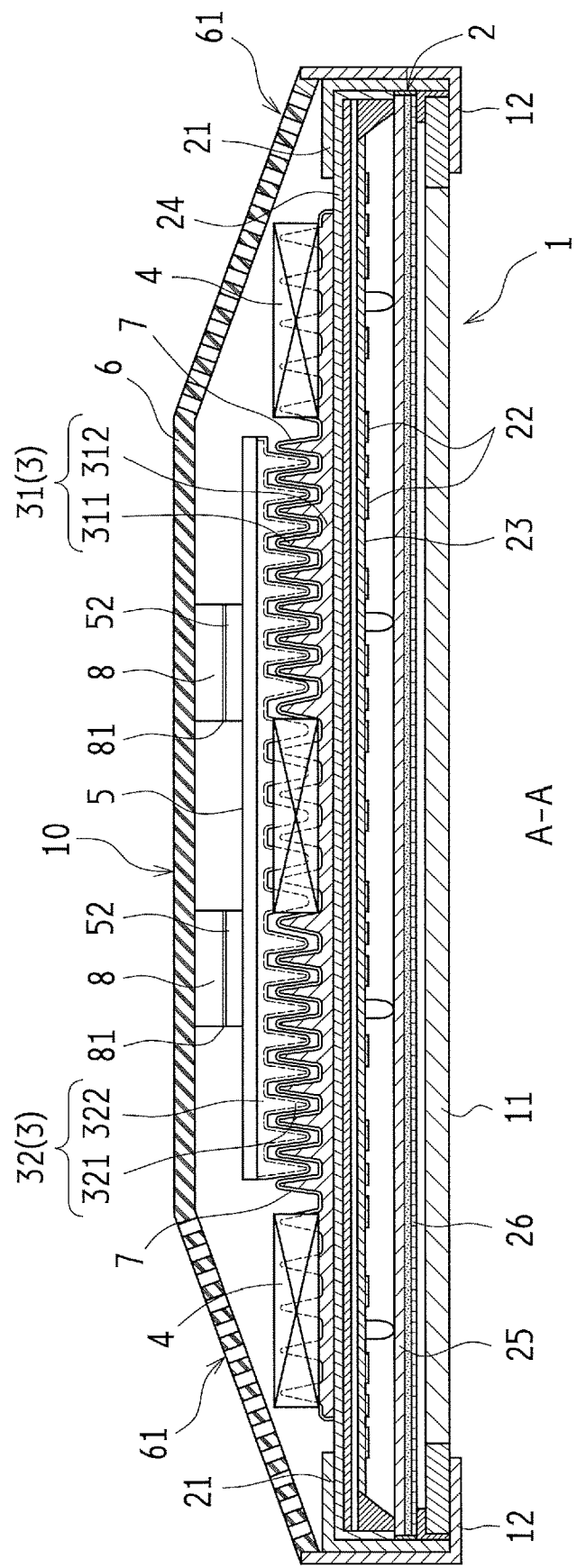
FIG. 11 is a sectional view of a liquid crystal display device according to Embodiment 5 of the present invention, taken along the line A-A in FIG. 1.
Figure 12:
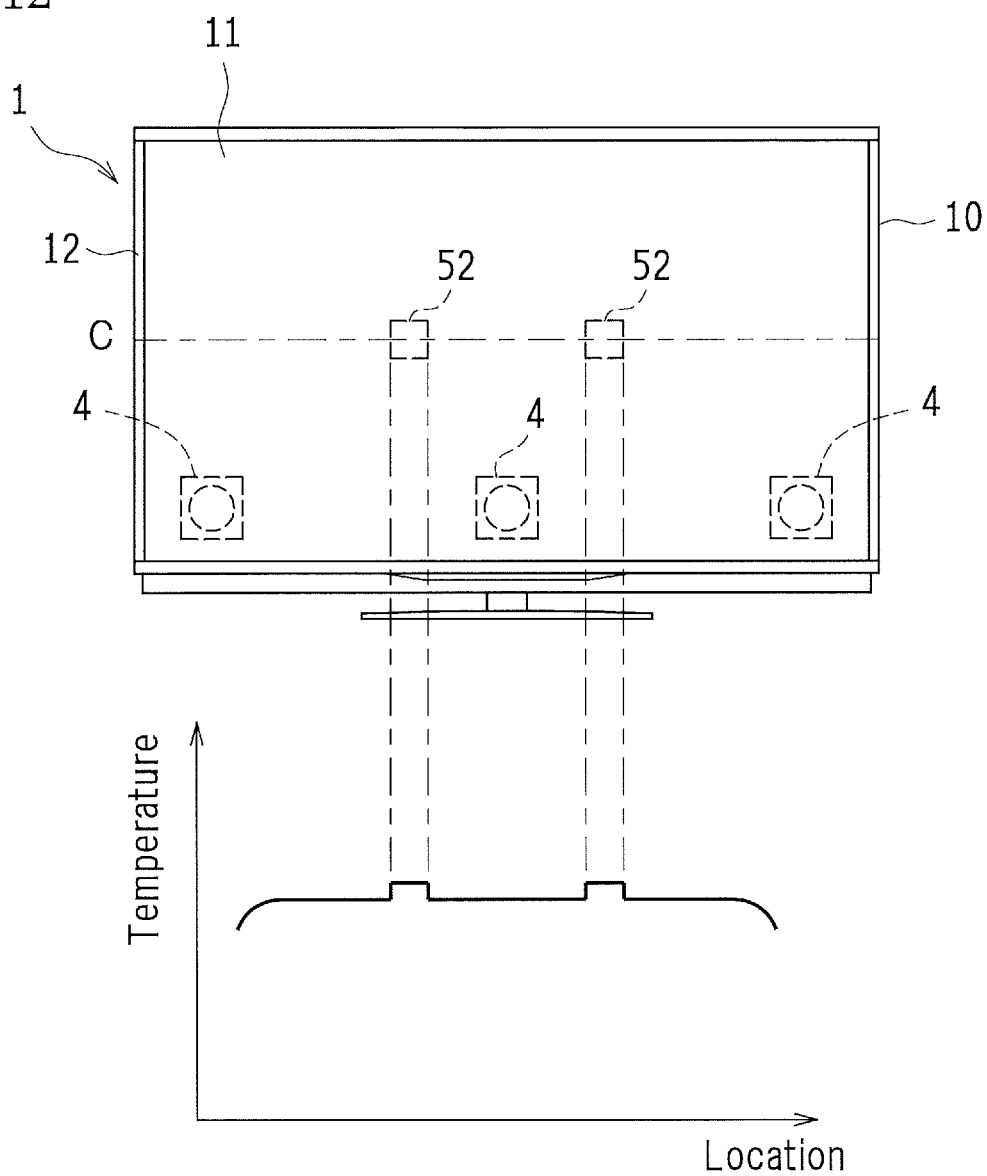
FIG. 12 is an explanatory illustration showing an example of temperature distribution in the liquid crystal display device according to Embodiment 5 of the present invention.

FIG. 11 is a sectional view of a device body 10 in a liquid crystal display device 1 according to Embodiment 5 of the present invention, taken along the line A-A in FIG. 1. FIG. 12 is an explanatory illustration showing temperature distribution in the liquid crystal display device 1 according to Embodiment 5. A feature of the liquid crystal display device 1 according to Embodiment 5 resides in radiator blocks 8.

Similar to the foregoing embodiments, the liquid crystal display device 1 is equipped with the control IC chips 52 mounted on the back surface of the liquid crystal panel control board 5 (the surface without the second radiator fin 32). In this liquid crystal display device 1, radiator blocks 8 are interposed between the control IC chips 52 and the cabinet 6, as shown inn FIG. 11.

For example, the radiator blocks 8 are block-shaped members made of a highly heat-conductive metal such as aluminum, copper or iron, or a highly heat-conductive material such as a ceramic material. The thickness of the radiator blocks 8 corresponds to the clearance between the control IC chips 52 and the cabinet 6 so as to fill the clearance. The radiator blocks 8 fit tightly on the control IC chips 52 via radiator sheets 81.

The radiator blocks 8 transfer heat generated by the control IC chips 52 to the cabinet 6. The heat transferred to the cabinet 6 is diffused entirely across the cabinet 6 and dissipated to the outside.

The graph in FIG. 12 represents, by a solid line, temperature distribution in the liquid crystal display device 1 on the line C. The overall temperature of the liquid crystal display device 1 increases at the control IC chips 52 mounted on the liquid crystal panel control board 5, but the temperature at the control IC chips in Embodiment 5 shown in FIG. 12 rises less than in Embodiment 4 shown in FIG. 9. This result proves sufficient heat dissipation, a less increase in temperature, and effective cooling by the radiator blocks 8.

Thus, the liquid crystal display device 1 according to Embodiment 5 can solve the problem of an unstable display action due to heat generation by the control IC chips 52.

Embodiment 6

Figure 13:
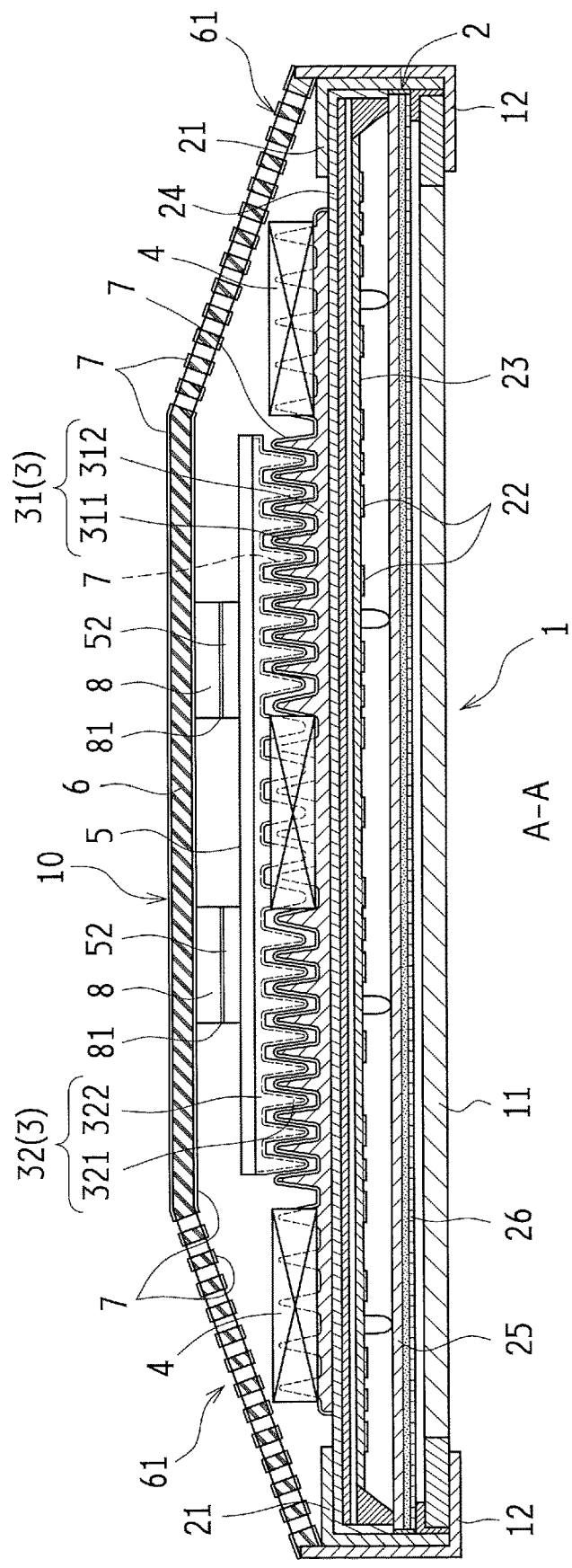
FIG. 13 is a sectional view of a liquid crystal display device according to Embodiment 6 of the present invention, taken along the line A-A in FIG. 1.
Figure 14:
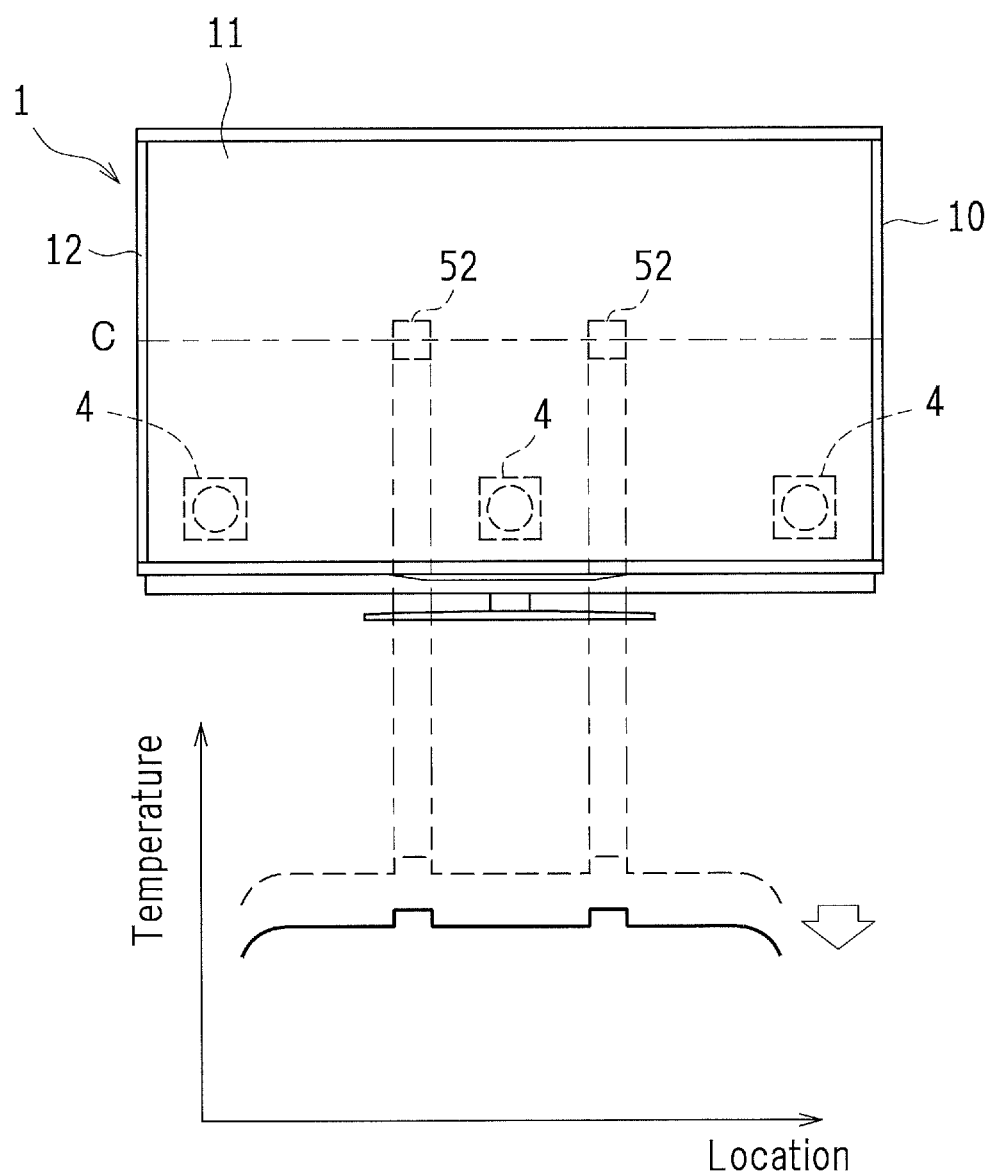
FIG. 14 is an explanatory illustration showing an example of temperature distribution in the liquid crystal display device according to Embodiment 6 of the present invention.

FIG. 13 is a sectional view of a device body 10 in a liquid crystal display device 1 according to Embodiment 6, taken along the line A-A in FIG. 1. FIG. 14 is an explanatory illustration showing temperature distribution in the liquid crystal display device 1 according to Embodiment 6. A feature of the liquid crystal display device 1 according to Embodiment 6 resides in an additional heat-radiating member 7 on the cabinet 6.

As shown in FIG. 13, the liquid crystal display device 1 has an additional heat-radiating member 7 on the front surface and the back surface of the cabinet 6. The additional heat-radiating member 7 is similar to the heat-radiating members 7 described in Embodiment 2, and its base material is a heat-radiating material having a high heat conductivity and a high heat dissipation capacity. The additional heat-radiating member 7 improves the heat dissipation effect of the cabinet 6.

The heat-radiating members 7 on the radiator fin 3 and the liquid crystal panel control board 5 and the additional heat-radiating member 7 on the cabinet 6 are made of the same heat-radiating material. By using an identical heat-radiating material, these heat-radiating members 7 can have the same coefficient of linear expansion, and can thereby distribute a deforming stress such as expansion and contraction in these members.

The graph in FIG. 14 represents, by a solid line, temperature distribution in the liquid crystal display device 1 according to Embodiment 6 on the line C. For comparison, temperature distribution in the liquid crystal display device 1 according to Embodiment 5 is given by a broken line. As evident from this comparison, the additional heat-radiating member 7 on the cabinet 6 can prevent an overall temperature increase in the liquid crystal display device 1 according to Embodiment 6, which proves more effective heat dissipation.

Thus, the liquid crystal display device 1 according to Embodiment 6 can solve the problem of an unstable display action due to heat generation by the control IC chips 52.

As described above, the liquid crystal display devices 1 according to the present invention can efficiently dissipate heat via the radiator fin 3 and can enhance the heat dissipation effect by the cooling fans 4. The present invention is not limited to the liquid crystal display devices 1 according to the foregoing embodiments, and may be modified in various manners within the scope of the claims, for example, as to the shape of the radiator fin 3, the number of cooling fans 4, etc. The technical range of the present invention also encompasses other embodiments made by appropriate combinations of the technical measures disclosed in separate embodiments.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A liquid crystal display device having a liquid crystal panel and a backlight unit equipped with a plurality of light sources for illuminating the liquid crystal panel from behind, the liquid crystal display device comprising a radiator fin and a cooling fan both provided on a back surface of the backlight unit, the back surface being an opposite side of a side, which faces the liquid crystal panel, of the backlight unit, wherein the cooling fan is configured to draw air into the liquid crystal display device from a side opposite to the backlight unit and to create an airflow toward the radiator fin, wherein the liquid crystal display device further comprises a liquid crystal panel control board configured to control driving of the liquid crystal panel, wherein the liquid crystal panel control board faces a back side of the radiator fin, the back side being an opposite side of a side, which faces the backlight unit, of the radiator fin, and the liquid crystal panel control board is spaced from the radiator fin, wherein the radiator fin comprises:
   a first radiator fin provided on the back surface of the backlight unit; and
   a second radiator fin opposed to the first radiator fin and provided on the front surface of the liquid crystal panel control board facing the first radiator fin, wherein the first radiator fin and the second radiator fin each include a plurality of fins, and wherein the first radiator fin and the second radiator fin are opposed to each other so as to be engaged with each other in such a manner that a fin of one radiator fin is engaged between two adjacent fins of the other radiator fin with being spaced from each other to avoid mutual contact.

2. The liquid crystal display device according to claim 1, wherein the cooling fan is provided in a lower part of the backlight unit that is installed upright.

3. The liquid crystal display device according to claim 1, wherein the radiator fin has a plurality of fins arranged vertically along the backlight unit that is installed upright.

4. The liquid crystal display device according to claim 3, wherein the radiator fin is provided entirely across the back surface of the backlight unit, and includes a dense area in which the fins are arranged more densely than in a remaining area on the back surface of the backlight unit.

5. The liquid crystal display device according to claim 4, wherein the cooling fan is provided in the remaining area excluding the dense area, in a lower part of the backlight unit that is installed upright.

6. The liquid crystal display device according to claim 1, wherein the cooling fan is a centrifugal fan configured to draw in air in a rotational axis direction of the cooling fan and to create an airflow in a diametrical direction of the cooling fan.

7. The liquid crystal display device according to claim 1, wherein the liquid crystal panel control board is equipped with a heat-radiating member on a front surface thereof facing the radiator fin.

8. The liquid crystal display device according to claim 1, further comprising:
   a cabinet for covering the backlight unit and the liquid crystal panel control board, placed behind the backlight unit;
   a control IC chip mounted on a back surface of the liquid crystal panel control board not facing the radiator fin; and
   a radiator block provided between the control IC chip and the cabinet.

9. The liquid crystal display device according to claim 8, wherein the cabinet is equipped with a heat-radiating member on a front surface and a back surface thereof.

10. The liquid crystal display device according to claim 1, wherein the radiator fin is equipped with a heat-radiating member.

* * * * *